Patented Aug. 8, 1950

2,517,576

UNITED STATES PATENT OFFICE 2,517,576

PROCESS FOR PREPARING ALPHA-IONONES

Garry C. Kitchens, Rutherford, N. J., assignor to The Givaudan Corporation, a corporation of New Jersey No Drawing. Application February 5, 1948, Serial No. 6,560

6 Claims. (Cl. 260—587)

This invention relates to a novel method for preparing alpha-ionones, and more especially it involves conducting the isomerization of pseudo-ionones in the presence of boron trifluoride.

Pseudo-ionones are condensation products of aldehydes, such as citral, and ketones, such as acetone. It is known that such ionones can be isomerized to true ionones by heating them in the presence of a number of acidic reagents, such as sulfuric, formic or phosphoric acids. Such processes however result in the formation of mixtures of alpha-ionones and beta-ionones. While methods favoring the formation of beta-isomers are known, no method which will yield a product consisting substantially of the alpha-isomers is known. The importance of being able to make substantially pure alpha-isomers in a simple process is indicated, for example, by the fact that perfumers prefer alpha-ionone over the beta-ionone. In accordance with presently known methods in order to obtain the alpha isomers it is necessary to resort to chemical purification techniques, as by converting the mixture of alpha- and beta-ionones to their addition products with carbonyl reagents, such as sodium bisulfite, hydroxylamine, or semi-carbazide.

By my present invention, I have succeeded in providing a process for making alpha-ionones in substantially pure form directly, without the need of resorting to expensive or time-consuming chemical purification techniques. This desirable result is brought about by my employment of boron trifluoride as a cyclizing or isomerization agent.

The special value of boron trifluoride in yielding a process which permits the preferential formation of the alpha-isomers was unexpected, as similar substances, such as boron trichloride, aluminum chloride, aluminum fluoride, phosphorous pentachloride and thionyl chloride fail to yield any true ionones at all.

In general, my process is conducted by passing dry boron trifluoride into the pseudo-ionone being treated at temperatures within the range from about −25° C. to +30° C. until saturated. The reaction mixture is then treated with an aqueous caustic solution, to decompose the boron trifluoride addition compound. Solvent extraction followed by distillation yields the alpha-ionones in satisfactory pure form.

It has been found that when less than one molecular equivalent of boron trifluoride per molecular equivalent of pseudo-ionone has been used, only small amounts of the true ionones are produced. I have found that a good yield of true ionones is obtained only when at least a stoichiometrical amount of boron trifluoride, based on the pseudo-ionone, is employed.

My process does not require the use of a pure or substantially pure pseudo-ionone, a poor grade thereof having a low ketone content having been found suitable, yielding an alpha-ionone of high purity.

The temperatures at which the isomerization or cyclization is effected may be varied within rather wide limits. I have obtained satisfactory results at temperatures from about −25° C. to about +30° C. In general, I prefer to employ solvents, such as benzene, toluene or carbon tetrachloride and temperatures within the range from about 0° C. to 5° C. for the addition of boron trifluoride and temperatures between 10° C. and 15° C. for the rest of the treatment.

In order more fully to illustrate my invention the following examples are given. It is understood they are for purposes of illustration and are not intended to limit the invention.

EXAMPLE 1

*Preparation of alpha-ionone*

A solution containing 400 ml. of anhydrous benzene and 192 grams of pseudo-ionone (purity 98.3) per cent; specific gravity 25°/25° C.=0.8945; refractive index at 20° C.=1.5290) was chilled in an ice-salt bath and 76 grams of boron trifluoride were passed in slowly; during a period of about 45 minutes, under good agitation. The temperature was maintained between 0° C. and 5° C. during the addition. The temperature rose to 10° C. to 15° C. as cyclization progressed, after which it was cooled to 5° C. and 250 ml. of an 8 per cent aqueous sodium hydroxide solution was added slowly, over a period of 15 to 20 minutes, the temperature being kept below 10° C.

The reaction mixture was allowed to settle and the lower layer was decanted off and discarded. 250 ml. more of the aforementioned sodium hydroxide solution was added to the remaining part of the reaction mixture, which became alkaline. The lower layer, after settling, was decanted and the remaining benzene solution of alpha-ionone was washed with water until neutral.

The benzene was removed by atmospheric distillation, and the residue was agitated with 100 grams of aqueous 25 per cent sodium hydroxide solution for one hour at 20° C. to 30° C., to remove impurities. 400 ml. of benzene was added and the caustic layer was separated. The benzene layer was washed with water until neutral and the benzene was removed by atmospheric distillation.

The residue was vacuum-distilled, giving 153 grams of alpha-ionone having the following properties:

| | |
|---|---|
| Purity | 98.4 per cent |
| Specific gravity 25°/25° C | 0.9295 |
| Refractive index at 20° C | 1.4995 |
| Halogen | Free |
| Color | Water white |
| Assay | 90 to 96 per cent alpha-ionone |

EXAMPLE 2

Preparation of alpha-methyl-ionones

A solution containing 400 ml. of benzene and 206 grams of pseudo-methyl-ionone (prepared by condensing citral and methyl ethyl ketone: Assay 62.1 per cent pseudo-normal-methyl-ionone and 33.4 per cent pseudo-iso-methyl-ionone; specific gravity 25°/25° C.=0.8936; refractive index at 20° C.=1.5235) was treated with 74.0 grams of boron trifluoride gas as described above in Example 1 and the reaction products were worked up as described in Example 1. 148 grams of alpha-methyl-ionones having the following properties were obtained:

| | |
|---|---|
| Purity (total cyclized ketones) | 98 per cent |
| Specific gravity 25°/25° C | 0.9251 |
| Refractive index at 20° C | 1.4972 |
| Assay | 69 per cent normal-methyl-ionone, 25 per cent iso-methyl-ionone. |

In similar manner, a solution of 300 ml. of toluene and 333 grams of pseudo-methyl-ionone (prepared from citral and methyl ethyl ketone: Assay=93 per cent pseudo-iso-methyl-ionone and 5 per cent pseudo-normal-methyl-ionone; specific gravity 25°/25°=0.8995; refractive index at 20° C.=1.5240) was treated with 116 grams of boron trifluoride, 246.2 grams of alpha-methyl-ionones, having the following properties, being obtained:

| | |
|---|---|
| Purity (total cyclized ketones) | 97.3 per cent |
| Specific gravity 25°/25° C | 0.9292 |
| Refractive index at 20° C | 1.4985 |
| Assay | 90 per cent iso-methyl-ionone and 5 per cent normal-methyl-ionone |

EXAMPLE 3

Preparation of alpha-allyl-ionones

Proceeding in accordance with Example 1, 117 grams of pseudo-allyl-ionone (purity=99.2 per cent; refractive index at 20° C.=1.5280) was cyclized, and 81 grams of alpha-allyl-ionone, having the following properties, were obtained:

| | |
|---|---|
| Purity per cent | 97.1 |
| Specific gravity 25°/25° C | 0.9294 |
| Refractive index at 20° C | 1.5040 |

The foregoing illustrates the invention, which however is not to be limited thereby and limited solely by the appended claims.

I claim:

1. In the process for preparing alpha-ionones, the improvement which comprises treating under substantially anhydrous conditions the corresponding pseudo-ionones with at least a molecular equivalent of boron trifluoride, until cyclization is substantially complete.

2. In the process for preparing alpha-ionones, the improvement which comprises treating under substantially anhydrous conditions the corresponding pseudo-ionones with at least a molecular equivalent of boron trifluoride at a temperature within the range from about −25° C. to about 30° C., until cyclization is substantially complete.

3. In the process for preparing alpha-ionones, the improvement which comprises treating under substantially anhydrous conditions the corresponding pseudo-ionones with from about 1 to about 1.1 molecular equivalents of boron trifluoride at a temperature within the range from about −25° C. to about 30° C., until cyclization is substantially complete.

4. The process of claim 3, wherein pseudo-ionone is the pseudo-ionone treated.

5. The process of claim 3, wherein pseudo-methyl-ionone is the pseudo-ionone treated.

6. The process of claim 3, wherein pseudo-allyl-ionone is the pseudo-ionone treated.

GARRY C. KITCHENS.

REFERENCES CITED

The following references are of record in the file of this patent:

Staudinger et al., Helv. Chim. Acta, vol. 9, pages 529–549 (1926).

Kastner, Angewandte Chemie, vol. 54, pages 273–281 (1941).

Royals, Ind. Eng. Chem., vol. 38, pages 546–548 (1946).